Patented Dec. 11, 1923.

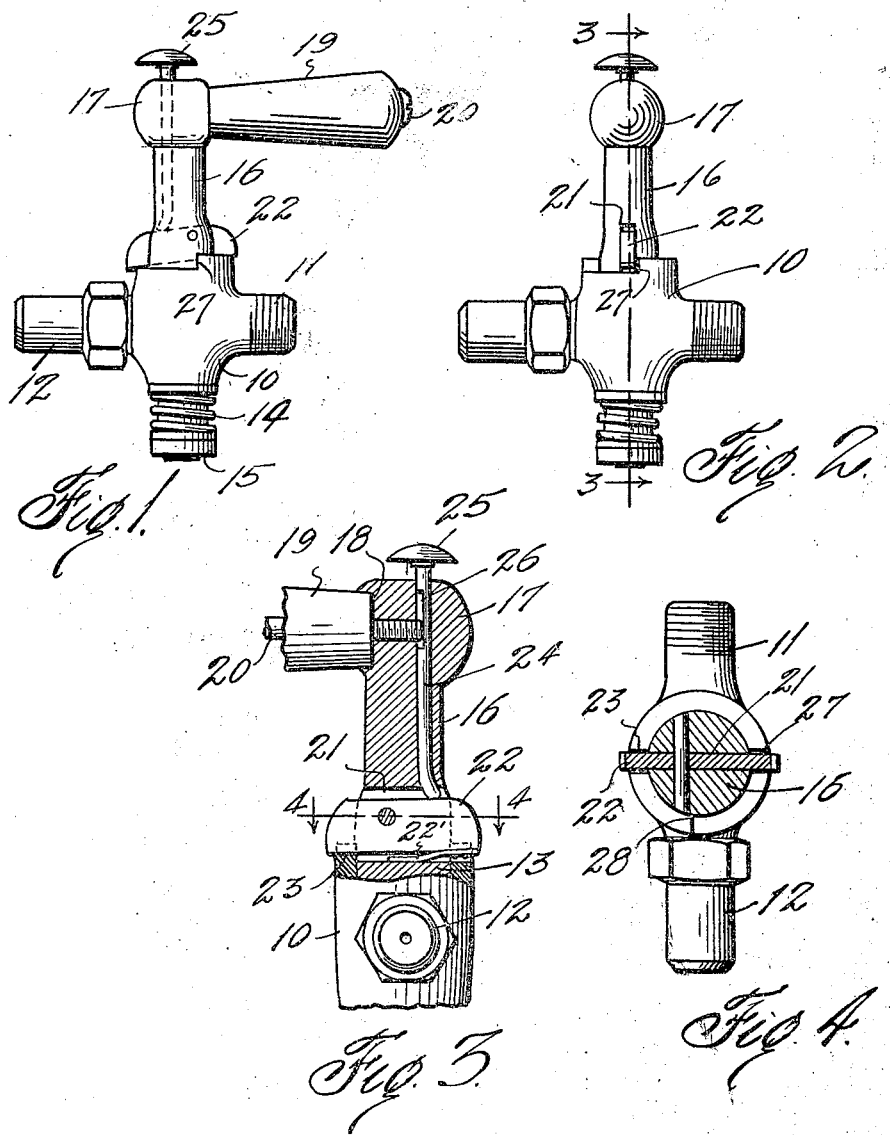

1,477,133

UNITED STATES PATENT OFFICE.

GOTTLIEB LANGE, OF DALLAS, TEXAS.

GAS COCK.

Application filed March 25, 1922. Serial No. 546,576.

*To all whom it may concern:*

Be it known that I, GOTTLIEB LANGE, a citizen of the United States, residing at Dallas, in the county of Dallas and State of Texas, have invented certain new and useful Improvements in Gas Cocks, of which the following is a specification.

This invention relates to new and useful improvements in gas cocks.

The object of the invention is to provide a safety appliance for a gas cock such as is used on gas ranges, stoves and heaters, involving a locking means which must be released before the handle can be swung or the valve turned to permit the passage of gas thru the cock. Such an arrangement is particularly useful where there are small children and is also advantageous in making a test as to whether or not the cock is open and the gas escaping. It will be seen that if the gas cock is open, the valve may be easily turned, but if it is closed the lock must be released before said valve can be turned.

A particular feature is to provide a releasing plunger in a convenient position to be readily engaged by the thumb of the person operating the gas cock, whereby a natural and simple operation may be had. A further object of the invention is to employ the locking device as stop for limiting the turning movement of the valve in opening and closing the cock.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a side elevation of a gas cock constructed in accordance with my invention, and showing the same in its open position, Fig. 2 is a similar view with the valve in its closed position, Fig. 3 is an enlarged vertical sectional view of a portion of the gas cock and taken on the lines 3—3 of Fig. 2, and Fig. 4 is a horizontal cross sectional view on the lines 4—4 of Fig. 3.

In the drawings the numeral 10 designates the body of an ordinary gas cock having a screw threaded nipple 11, mounted on one side and the usual spud 12 or other gas burner connection on the other side. It is to be understood that the nipple 11 may either be screw threaded or arranged to be connected with a rubber hose. The usual tapered valve 13 is mounted in the body and held in its seat by the spring 14 and lock nut 15. The stem 16 of the valve extends above the body and terminates in the usual head 17 which has a socket 18 in one side for receiving the handle 19. The handle 19 is held in place by a screw 20 passing therethru and having screw threaded engagement in the head of the stem. The parts just described form the structure of an ordinary gas cock to which my invention may be applied.

In applying my invention I cut a vertical slot 21 transversely thru the valve stem and mount therein a latch lever 22 which is pivoted to one side of the center of the stem. To the underside of the lever at one end I attach a flat spring 22' which is bowed so as to rest on the bottom of the slot and force the long end of the lever upwardly. The short end of the lever is adapted to engage in a notch 23 in the rim of the housing. So long as the lever is in engagement with this notch, the valve cannot be turned. A vertical plunger 24 is mounted in the valve stem on the opposite side of the center from the pivot of the lever latch, and has its lower end slightly bent so as to rest on the long end of the latch. The plunger extends above the head 17 and carries a cap 25 on its upper end. By applying pressure on the cap the plunger is moved downwardly so as to depress the latch against the tension of the spring 22' and swing it out of the notch 23 whereby the stem and valve may be turned by swinging the handle 19. To limit the movement of the plunger 24, a slot 26 is provided in one side thereof and the screw 20 is made long enough to enter said slot, whereby the shoulders at each end would engage said screw and limit the movement as described.

The rim of the body is provided with shoulders 27 and 28 respectively, and is cut down between said shoulders. The long end of the latch lever swings over the rim between these shoulders. When the latch is resting in the slot 23, it is in engagement with the shoulder 27, and the valve is closed. This shoulder acts to arrest the latch and limit the turning movement of the valve enclosed in the same. When the valve is swung to its open position the latch will engage the shoulder 28, and position the valve correctly to permit a free flow of gas therethru.

In using the cock the operator grasps the handle and places the thumb upon the cap 25, then by pressing on said cap the plunger 24 is moved downwardly whereby the latch 22 is tilted so that its short end is lifted out of the notch 23, whereby the handle 19 may be freely swung to open the cock. While the cock is in its open position the short end of the latch rests upon the rim of the body, so that when the handle is swung to close the cock, said latch readily drops into the notch 23 and locks the cock as is obvious. It will be seen that the handle 19 cannot be accidently swung to open the cock and also that unless the plunger is depressed the handle cannot be swung so that small children cannot readily operate the gas cock.

Various changes in the size and construction of the parts as well as modifications, may be made without departing from the spirit of the invention.

What I claim is:

In a safety gas cock, the combination of a body, a rim provided on one side with shoulders and on the opposite side with a notch, a rotatable valve in the body, a stem extending from the valve above the body and having a transverse slot extending therethrough, a latch extending through the slot and projecting on opposite sides of the stem, one end of the latch engaging in the notch and the other end of the latch lying between the shoulders, the latch being pivoted in the slot nearer one side of the stem, a vertical plunger in the stem having its lower end projecting into the slot and bent, whereby it is retained against upward displacement, the bent end of the plunger bearing on the shoulder-end of the latch away from the pivot, and a supporting spring under the end of the latch lying between the shoulders.

In testimony whereof I affix my signature.

GOTTLIEB LANGE.